(12) United States Patent
Yoshimura

(10) Patent No.: US 7,535,559 B2
(45) Date of Patent: May 19, 2009

(54) OBJECT DIGITIZING DEVICE USING INTEGRATING SPHERE WAVE SOURCE

(75) Inventor: Hirokazu Yoshimura, Saitama (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 116 days.

(21) Appl. No.: 11/575,405

(22) PCT Filed: Aug. 17, 2005

(86) PCT No.: PCT/JP2005/014977

§ 371 (c)(1),
(2), (4) Date: Mar. 16, 2007

(87) PCT Pub. No.: WO2006/030597

PCT Pub. Date: Mar. 23, 2006

(65) Prior Publication Data

US 2008/0002385 A1    Jan. 3, 2008

(30) Foreign Application Priority Data

Sep. 17, 2004  (JP) .............................. 2004-270668

(51) Int. Cl.
*G01J 1/04* (2006.01)
(52) U.S. Cl. ...................................... 356/236; 250/228
(58) Field of Classification Search ................. 356/236, 356/445–446; 250/228; 362/298, 302, 346, 362/551
See application file for complete search history.

(56) References Cited

U.S. PATENT DOCUMENTS

| 3,764,364 | A | * | 10/1973 | Seiner | 427/163.4 |
| 4,583,860 | A | * | 4/1986 | Butner | 356/446 |
| 4,868,383 | A | * | 9/1989 | Kurtz et al. | 250/228 |
| 4,995,727 | A | * | 2/1991 | Kawagoe et al. | 356/402 |
| 5,098,195 | A | * | 3/1992 | Halyo et al. | 374/9 |
| 5,537,203 | A | * | 7/1996 | Carr | 356/236 |
| 6,810,161 | B2 | * | 10/2004 | Flower et al. | 385/15 |

FOREIGN PATENT DOCUMENTS

| JP | 4 110756 |   | 4/1992 |
| JP | 405302853 | A * | 11/1993 |
| JP | 7 146175 |   | 6/1995 |
| JP | 7 260698 |   | 10/1995 |
| JP | 2003110813 | A * | 4/2003 |
| JP | 2003 174544 |   | 6/2003 |
| JP | 2003 177061 |   | 6/2003 |

\* cited by examiner

*Primary Examiner*—Hoa Q Pham
(74) *Attorney, Agent, or Firm*—Oblon, Spivak, McClelland, Maier & Neustadt, P.C.

(57) ABSTRACT

An object image digitizing device using an integrating sphere wave source is provided which makes the degree of spatial uniformity and temporal stability of the spatial uniformity of the wave irradiation distribution over the output port surface of the integrating sphere for illumination of the transmissive object as precise as the degree of the digitalization requires.

11 Claims, 2 Drawing Sheets

OBJECT DIGITIZING DEVICE USING INTEGRATING SPHERE WAVE SOURCE

TECHNICAL FIELD

The present invention is related to object wave image digitizing device using waves such as visible light waves with an integrating sphere wave source for illuminating the object for digitization of the object image.

BACKGROUND ART

With progress of the two-dimensional imaging devices (two-dimensional imaging elements) such as CCD cameras, a method for direct and high speed digitization with a two-dimensional imaging device is expected to be dominant in digitizing technology of two-dimensional image over the conventional digitizing method by moving a one-dimensional imaging device such as a scanner.

As a prior art using an integrating sphere, a method and a system to convert an object image to a digital image signal is disclosed in the patent document 1 described below.

In addition, standard optical source devices are disclosed in the patent documents 2, 3, and 6 described below.

Furthermore, as a conventional technology by the inventor of the present invention, a high speed, high precision digitizing system by combining a CCD camera with high speed imaging capability and an integrating sphere is disclosed in the patent document 4 below, and a technology of disposing a planar optical diffusive device at the opening of an integrating sphere as a light source in order to take an image of a light source only is disclosed in the patent document 5 below

[Patent Document 1]
  Japanese Patent Application Laid-Open 7-15658
[Patent Document 2]
  Japanese Utility Patent Application Laid-Open 50-21586
[Patent Document 3]
  Japanese Patent Application Laid-Open 11-173913
[Patent Document 4]
  Japanese Patent Application Laid-Open 2003-110813
[Patent Document 5]
  Japanese Patent Application Laid-Open 2003-177061
[Patent Document 5]
  US Patent Application 2003-0185004A1

DISCLOSURE OF INVENTION

A problem to be solved for the above described direct and high speed digitization of an object image using a two-dimensional imaging device is precision of a light source. In order to read out the signal with high precision a light source illuminating the two-dimensional object must be spatially uniform and temporally stable.

The uniformity and the stability of the illuminating source are sensitive to the degree of the spherical shape of the integrating sphere and its variation. The shape of an integrating sphere, on the other hand, is sensitive to changes in the external environment such as temperature, pressure, or effect of gravity.

An integrating sphere for such a light source that satisfies high precision and stable environment is not available at present. Furthermore, a conventional scanner also have problems in the sense that it can not attain stability of the precision in time and space at a level higher than the level intrinsic the light source used for the scanner, even though a precision of 16 bits is often claimed nominally. Some methods to control the level of stability of the light source is essential for a high precision digitization.

By taking into account the situation described above, the aim of the present invention is to provide an object wave image digitizing device of high precision using an integrating sphere, which attains high precision wave irradiation distribution for the illumination of the object with spatial uniformity and high temporal stability at the illuminating surface of the wave source of the integrating sphere.

In order to achieve the aim described above, the present invention is described below by taking a visible light as an example.

[A] In the case where the illuminating wave is a visible light, the digitizing device comprises a light source with an integrating sphere light source where the illumination is spatially uniform and temporally stable, a transmissive object mounting assembly placed near the output port of the integrating sphere for the source light, and a two-dimensional imaging device for converting the transmissive object image into a digital image.

[B] The object image digitizing device using an integrating sphere light source described above in [A] is characterized by comprising a means of controlling the temperature and pressure of the external environment of the integrating sphere light source and the original light source lamp for feeding light into the integrating sphere.

[C] The object image digitizing device using an integrating sphere light source described above in [A] or [B] is characterized in that (1) the integrating sphere is made of deformable materials in order to keep the spherical shape of the integrating sphere as precise as the degree of precision of digitization requires; (2) the integrating sphere is covered by a solid sphere; and (3) the adjustment bolts are attached to the integrating sphere through the solid spherical cover, the bolts being driven by actuators at the heads of the adjustment bolts.

[D] The object image digitizing device using an integrating sphere light source described above in [C] is characterized by having a lamp assembly for the original light source within a space of said device.

[E] The object image digitizing device using an integrating sphere light source described above in [D] is characterized by circulating a cooling fluid through a space of said device.

[F] The object image digitizing device using an integrating sphere light source described above in [E] is characterized by having a lamp assembly for the original light source in the down stream of said cooling fluid flows.

[G] The object image digitizing device using an integrating sphere light source described above in [A] is characterized by having two light source components with two integrating spheres connected in cascade configuration in which one light source component feeds light into the next light source component.

[H] The object image digitizing device using an integrating sphere light source described above in any one of [A] to [G] is characterized by having the light diffusing reflection layer at the opening port of said integrating sphere and making the reflection layer at the opening part thinner than the rest part of the sphere thereof.

[I] The object image digitizing device using an integrating sphere light source described above in any one of [A] to [H] is characterized by realizing high precision digital gradation for the digitization by keeping the temporal variation of illumination over the opening port of said light source with the integrating sphere to less than $1/10^4$ by performing more than 16 bits of quantization with said two-dimensional imaging device.

The concept of the waves in the present invention include visible light waves, electromagnetic waves, waves due to mass motion of a medium such as sound, and quantum particle waves due to wave-particle dual nature of particles including electrons and so on. Wave nature is important for non-directive diffusive reflection at the inner surface of the integrating sphere for providing uniform output of the waves for the digitization.

BEST MODE FOR CARRYING OUT THE INVENTION

Description is given below by taking a case of visible light as an example of the illuminating waves.

An object image digitizing device using an integrating sphere light source comprises a light source with an integrating sphere in which the illumination is spatially uniform (even) and temporally stable, a transmissive object mounting assembly placed near the output port of the integrating sphere for the source lights and a two-dimensional imaging device for converting the transmissive object image into a digital image. Accordingly it is possible to attain uniformity of the irradiation distribution over the surface for illuminating the object to be digitized from the output port of the integrating sphere light source system, to stabilize the illuminating light in time, and then to digitize the object image with high precision

EMBODIMENT

Embodiments according to the present invention are described in more detail in the following.

Figure 1:
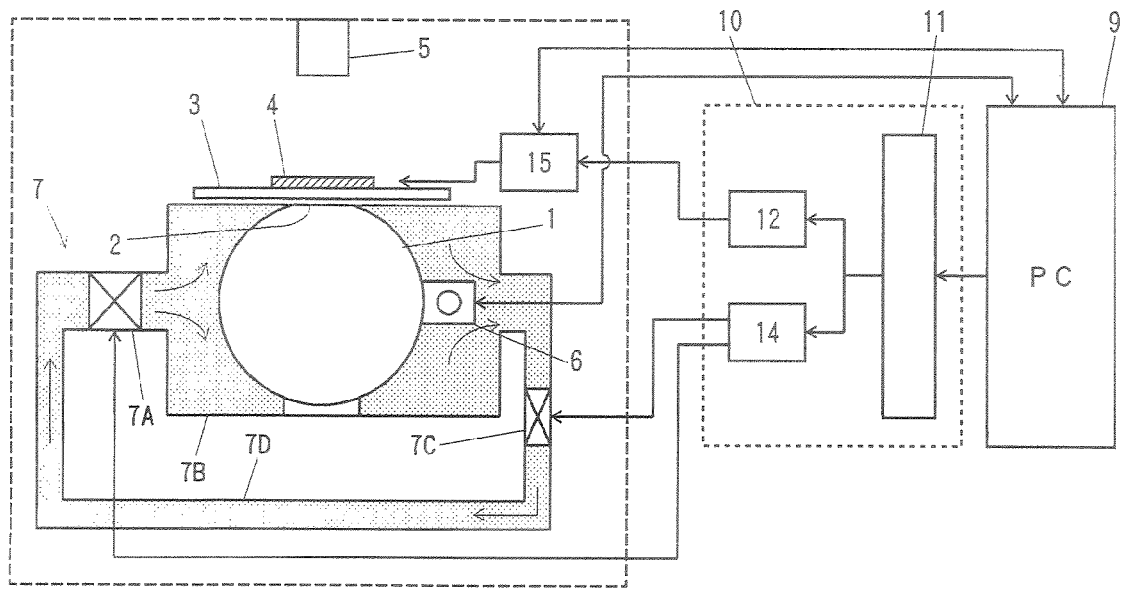
FIG. 1 is a schematic diagram of an object image digitizing device using an integrating sphere light source in accordance with an embodiment of the present invention.

FIG. 1 is a schematic diagram of an object image digitizing device using an integrating sphere light source in accordance with an embodiment of the present invention. Here, a transmissive object is an object through which the irradiating light can go through which includes photographic plates, photographic films, microfilms, and the like The object can be documentary materials, industrial materials, medical samples, and so on. An internal structure which is invisible with casual eyes can be revealed visually only after high precision digitization is attained. Such internal structure, which might be embedded inside the object but hidden by noises, cannot be revealed visually in low precision digitization.

In this figure, 1 is an integrating sphere light source illuminating the object uniformly (evenly) in space and stably in time. The interior of the integrating sphere is vacant, therefore the inside of the integrating sphere for the present invention must consist of only a spherical surface and no other structure is allowed. This is to say, a thinner semi-transparent and semi-reflecting layer must be provided even at the output port in the present invention so as not to disturb the spherical surface inside the integrating sphere. On the internal wall of the integrating sphere, reflection layer has a certain thickness to enhance the non-directional diffusive reflectance which is essential for the integrating sphere to provide the uniform light at the output port. 2 is an output port of the integrating sphere 1 to provide the exit of the light, 3 is a transmissive object mounting assembly placed near the exit part of the integrating sphere for the source light, 4 is a two-dimensional imaging device for converting the transmissive object image into a digital image, 5 is a two-dimensional imaging device to take image of the transmissive object 4 and to convert it into digital data, 6 is a lamp assembly to feed the original light into the integrating sphere, 7 is a temperature and pressure adjustment mechanism for the light source with the integrating sphere 1 comprising a temperature and pressure adjustment device 7A, a temperature and pressure adjustment chamber 7B, a fan 7C and a temperature and pressure adjustment duct 7D. This temperature and pressure adjustment mechanism 7 has a function to control a temperature and a pressure of the circulating air 9 is a PC (personal computer) to process the digital data, 10 is a controllers and this controller 10 comprises an input interface 11, a control part 12 of a control device 15 for the transmissive object and a control part 14 for the temperature and pressure adjustment mechanism 7 of the light source with the integrating sphere.

This embodiment has an arrangement to enhance and maintain the precision of spherical shape of the integrating sphere 1. The arrangement comprises the temperature and pressure adjustment mechanism 7 to cool the light source with the integrating sphere 1 and to keep the pressure constant. Cooling air is introduced from the temperature and pressure adjustment device 7A of the temperature and pressure adjustment mechanism 7 into the temperature and pressure adjustment chamber 7B, flows around the light source with the integrating sphere 1 and the lamp of the light source 6, then is introduced by the fan 7C into the temperature and pressure adjustment duct 7D, and returns back to the temperature and pressure adjustment device 7A through the temperature and pressure adjustment duct 7D.

Being constructed as described above, a temperature and a pressure of the external environment of the light source with the integrating sphere 1 is kept constant, thereby preventing the integrating sphere 1 from being deformed, which prevents change of uniformity of illumination at the output port of the integrating sphere caused by deformation of the integrating sphere 1.

Here, by configuring the lamp of the light source 6 on the down stream side of the cooling air flowing around the integrating sphere 1, an influence to the integrating sphere by heat generated by the lamp assembly of the light source 6 can be reduced. If, on the contrary, the lamp assembly 6 is configured on the upstream side of the integrating sphere 1, air warmed by the heat generated by the lamp assembly 6 is applied to the integrating sphere 1 and changes temperature distribution on the Integrating sphere 1 which in turn changes illumination distribution at the output port. These arise due to deformation of the integrating sphere by the thermal dilation strain on the integrating sphere 1.

By this arrangement, the heat generated by the lamp assembly of the light source 6 can be cooled and temperature distribution control of the integrating sphere becomes easier.

Furthermore, the lamp assembly of the original light source 6 is placed outside of the integrating sphere 1. This arrangement makes it possible to configure the internal reflectance sphere structure-less with a thinner semi-transparent and semi-reflecting layer at the input port of the integrating sphere or the light similar to the layer at the output port. This also enhances the ideal non-directive diffusive reflectance property at the inner surface of the integrating sphere, and makes replacement and control of the lamp assembly of the light source easier.

An arrangement for minimizing deformation the integrating sphere light source caused by the effect of gravity is described in the following.

Figure 2:
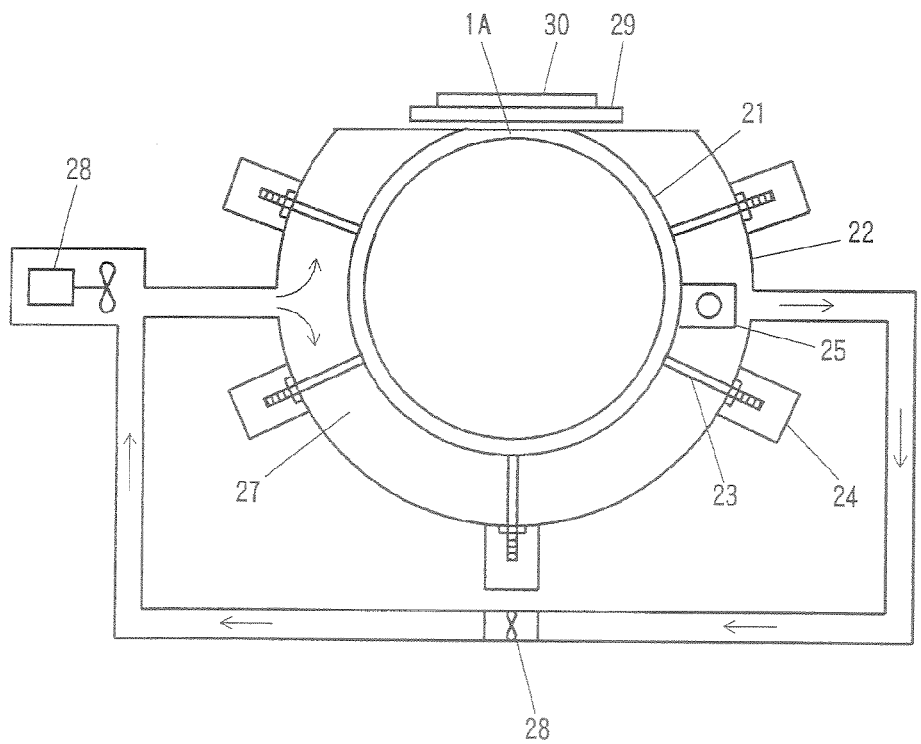
FIG. 2 is a schematic diagram of an arrangement of the device to compensate deformation caused by gravity, changes of temperature pressure, and stress distribution exerted to the integrating sphere for the light source in order to keep the spherical shape of the sphere to the degree of precision that the digitization requires in accordance with an embodiment of the present invention.

FIG. 2 is a schematic diagram of an arrangement to minimize deformation of the integrating sphere due to the effect of gravity in accordance with an embodiment of the present invention.

In this Figure, 21 is an integrating sphere light source made of deformable material Nothing is disposed inside of the integrating sphere light source 21, so that the structure is made only of the spherical surface. Furthermore, on the wall inside the integrating sphere 21 a non-directional reflection layer with reflectivity of more than 99%, for example, is formed to enhance the non-directional diffusive reflectance property. Such a layer can be achieved by using Spectralon made by Labsphere Co., for example. 22 is a solid spherical cover to support the integrating sphere 21, and 23 is an adjustment bolt which protrudes outside of the integrating sphere 21. This adjustment bolt 23 passes through the solid spherical cover 22, and on top of the bolt a finely driven actuator (an electromagnetic actuator or the like) 24 is disposed in order to correct any strain of the integrating sphere light source 21 induced by the gravity, thereby maintaining the precision of the spherical surface of the interior reflecting surface. 25 is a single lamp of the light source to feed the light into the integrating sphere 21. A space 27 is formed between the outer surface of the integrating sphere 21 and the inner surface of the solid spherical cover 22 By circulating cooling fluid with use of a cooling fan 28 into this space 27, the integrating sphere light source 21 and the lamp assembly of the light source 25 can be cooled. Furthermore, a pressure adjustment arrangement (not shown) can be provided to keep constant the pressure distribution of the cooling fluid in this space 27. In addition, in this figure, 29 is a transmissive object mounting assembly for a transmissive object, 30 is a transmissive object set on the mounting assembly.

Here, a sheet (not shown) for illumination test is set on the transmissive object mounting assembly. The sheet is illuminated by the integrating sphere light source, and the finely driven actuator 24 operates to correct deformation of the integrating sphere to correct any time variation in the illumination.

Correction of the deformation of the outer shape of the integrating sphere 21 is achieved by supporting it at multiple points. Similarly, correction of the change of strain of the integrating sphere 21 due to temperature distribution changes is achieved. In this way, correction of change of illumination at the output port can be made by operating the finely tuning actuators 24 when a time variation in illumination of the object to be digitized happens.

Figure 3:
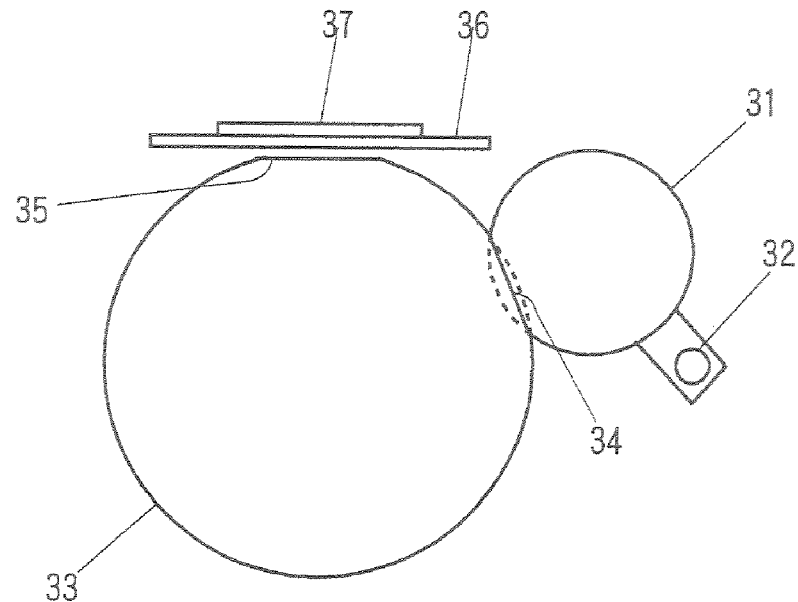
FIG. 3 is a schematic diagram of an arrangement to achieve such a precision of uniformity and its stability of the light source with the integrating sphere in accordance with an embodiment of the present invention.

Next, an arrangement to achieve an ideal reflectance case of the integrating sphere is described in the following FIG. 3 is a schematic diagram of such an arrangement in accordance with an embodiment of the present invention In this figure, 31 is the first integrating sphere light source assembly, 32 is a lamp of the original light source of the first integrating sphere light source 31, 33 is a second integrating sphere light source with the first integrating sphere light source 31 as the feeding light source, 34 is an opening to join the first light source with the integrating sphere 31 with the second light source with the Integrating sphere 33, 35 is an opening of the second light source with the integrating sphere 33, 36 is a transmissive object mounting assembly for a transmissive object, and 37 is a transmissive object. Between the two integrating spheres, a thinner semi-transparent and semi-reflecting layer is placed to allow the penetration of the light from the first integrating light source system into the second integrating light source system and at the same time to preserve the internal non-directive diffusive reflection of light for both integrating spheres.

By this configuration the non-directive diffusive light from the first light source with the integrating sphere 31 is fed into the second integrating sphere light source 33. An ideal uniform light can be obtained from the output port 35 of the second light source with the integrating sphere 33, thereby providing a highly uniform light source for illumination of the transmissive object 37 on the mounting assembly.

Figure 4:
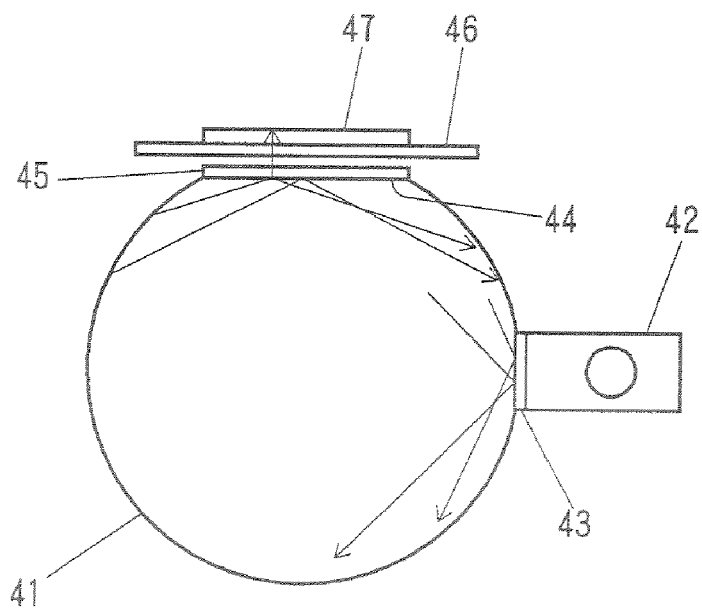
FIG. 4 is a schematic diagram of an arrangement for improving the diffusive non-directive reflection characteristics of the integrating sphere by providing diffusive non-directive internal reflection also at the opening port of the integrating sphere light source which is similar to the reflection at the inner surface of the integrating sphere which is achieved by a semi-transparent and semi-diffusive reflecting layer at the output port, in accordance with an embodiment of the present invention, the internal surface of the layer at the output port being of spherical shape as a part of the internal spherical surface of the integrating sphere.

FIG. 4 is a schematic diagram of an arrangement for improving the reflection characteristic inside the integrating sphere by configuring the system so that the non-directive diffusive reflection takes place also at the output port of the integrating sphere in accordance with an embodiment of the present invention.

In this figure, 41 is the internal reflectance surface of the integrating sphere, 42 is a lamp assembly for the original light source, 43 is a semi-transparent and semi-reflecting layer between the integrating sphere 41 and an opening of the lamp assembly of the light source 42, 44 is an output port of the integrating sphere 41, 45 is a semi-transparent and semi-reflecting at the output port 44 of the integrating sphere 41, 46 is a transmissive object mounting assembly for a transmissive object to be digitized, and 47 is a transmissive object set on the mounting assembly By this arrangement the original light that comes into the integrating sphere 41 from the lamp assembly can be reflected by the semi-transparent and semi-diffusive reflecting layer 43 after reflection within the interior of the integrating sphere 41. Similar reflection and penetration happen at the output port 44 where semi-transparent and semi-diffusive reflecting layer is configured. A part of the reflected light from the integrating sphere 41 to the semi-transparent and semi-diffusive reflecting layer 45 become, of course, an irradiating light with high spatial uniformity, which illuminate the transmissive object 47 set on the transmissive object mounting assembly with the transmissive object 46.

As shown in FIG. 2, layer thickness of the non-directive diffusive reflection layer 1A in the output port of the integrating sphere is designed to be thinner than that of the remaining part Furthermore, the spherical shape of the internal reflection layer is kept to give as small disturbance as possible to the distribution of the reflection layer This is achieved by designing the layer thickness of the diffusive reflection layer 1A in the opening part of the integrating sphere, which is an output port of the waves from the integrating sphere, to be thinner than that of the remaining part.

Furthermore, the two-dimensional imaging device to form an image of a transmissive object and quantize and convert it to a digital form used in the present invention, as an example, utilizes more than 16 bits quantization in place of the conventional 10 bits quantization to improve the digital gradation accuracy. In the embodiment described above, the uniformity and the stability of the irradiation light that illuminate the object can also be of the equivalent precision of less than $1/10^4$ and the quantization accuracy of more than 16 bits can be obtained.

As described above, according to the present invention, the spherical shape of the integrating sphere is achieved with high precision and its accuracy is maintained More specifically, external environmental parameters such as temperature and pressure are kept constant, and influence by the effect of gravity can be minimized. In principle, any deformation of the integrating sphere can be prevented by the actuators described above.

The present invention is not limited to the above-described embodiment, various modifications can be made without departing from the scope of the invention, and these modifications shall not be excluded from the scope of the invention.

According to the present invention, the following advantages can be obtained.

(A) Uniformity of the irradiation distribution over a surface of the output port of the integrating sphere as the wave source to illuminate the object to be digitized can be made as precise as the degree of precision of the digitization requires, and this uniformity can be kept temporally stable by actively driving the actuators to control the shape of the integrating sphere to the demanded degree of spherical shape.

(B) By adjusting a temperature and a pressure of the external environment of a wave source with an integrating sphere and a lamp assembly of the original light source, a stability in time of the light source with an integrating sphere for the digitization can be achieved (C) By making the integrating sphere by deformable material with a spherical cover to support the integrating sphere by multiple adjustment bolts for the integrating sphere, the bolts being driven by actuators arranged on the top, the deformation of the shape of the sphere can be corrected and the precision of the interior shape of the sphere can be kept to the degree that the digitization requires.

(D) By circulating cooling fluid around the integrating sphere, the heat generated by the original light source of the lamp assembly can be cooled (E) By configuring the device to place the original light source in the down stream of the cooling fluid, deformation due to temperature change can be minimized (F) The output port of the integrating sphere is covered with a semi-transparent and semi-reflectant layer by making this layer thinner than other part and hence keeping the spherical shape of the inner reflectance layer of the integrating sphere and yet allowing a part of the light inside the integrating sphere to escape to illuminate the object to be digitized. One example of the semi-transparent and semi-reflecting material is Spectralon made by Labsphere Co., which needs a certain thickness to reflect back almost 100 per cent incident light to the inner sphere and hence to act as an ideal non-directive diffusive reflecting material for the integrating sphere. If the thickness of the layer is not sufficient, it allows a part of the light to penetrate the layer and escape from the internal sphere and at the same time to reflect back part of the light inside the integrating sphere.

(G) By the object image digitizing device using the integrating sphere wave source described from (A) to (F), for example, temporal variation of the illumination over the output port of the integrating sphere can be kept below $1/10^4$ or less, and 16 bits or more of precision of digitization, is possible.

INDUSTRIAL APPLICABILITY

The object image digitizing device using the integrating sphere wave source of the present invention enables dynamic range (S/N) of digitization to the required degree of precision which is currently limited by the degree of precision of the wave or light source to illuminate the transmissive object which is often lower than the precision of the two-dimensional digitizing or quantizing devices such as CCD. According to the present invention, high precision digital imaging becomes possible by improving the degree of precision of the wave or light source. The industrial applicability is not limited to high precision digitization of films and plates or any other transmissive objects but also for analyzing image information of industrial materials medical articles, and work of art, by revealing internally hidden information with high precision digitization.

The invention claimed is:

1. An object image digitizing device using an integrating sphere wave source comprising;
   (a) an integrating sphere, without any spatial opening, the integrating sphere including a smooth continuous non-directional reflective layer formed on an internal surface of the integrating sphere to provide spatially uniform and temporally stable light or waves to a transmissive object to be digitized;
   (b) a partially-transparent and partially-reflective input port of the light and waves of the integrated sphere created by making a part of the reflective layer thinner than other parts of the layer through which the original external light and waves are configured to enter into the sphere so that the input port permits light or waves to pass through as well as to reflect light and waves toward the internal space of the sphere but keeping the internal distribution of the light and waves inside the sphere uniform and stable;
   (c) a partially-transparent and partially-reflective output port of the light and waves of the integrated sphere created by making a part of the reflective layer thinner than other parts of the layer through which internal light or waves are configured to escape from inside of the sphere to illuminate the transmissive object so that the output port permits light or waves to pass through as well as to reflect light and waves toward the internal space of the sphere but keeping the internal distribution of the light and waves inside the sphere uniform and stable;
   (d) a transmissive object mounting assembly for the transmissive object placed near the output port; and
   (e) a two-dimensional imaging device for imaging the transmissive object placed on the mounting assembly and converting the object image into digital form,
   wherein the sphericity of the shape of the internal non-directional reflective layer is provided such that the internal distribution of the light and waves inside the sphere is made spatially uniform and temporally stable to a precision degree that the digitization requires.

2. The object image digitizing device using an integrating sphere wave source in accordance with claim 1, further comprising: a means for controlling a temperature and a pressure distribution of external environment of the integrating sphere wave source in order to keep the sphericity of the integrating sphere to the precision degree that the digitization requires.

3. The object image digitizing device using an integrating sphere wave source in accordance with claim 1, wherein the wave source is a device for generating waves including visible light, electromagnetic waves, waves due to mass motion of a medium such as sound, and waves accompanied by quantum mechanical wave-particle dual nature of particles including electrons and the like.

4. The object image digitizing device using an integrating sphere wave source in accordance with claim 1, wherein the integrating sphere is made of deformable material in order to keep the sphericity of the shape of the integrating sphere as temporally precise as the precision degree of the digitization requires by actively adjusting actuators to provide spatially uniform and temporally stable light and waves to a transmissive object to be digitized at the output port of the integrating sphere, and characterized by comprising a spherical solid cover to surround the integrating sphere with a space outside the integrating sphere, and adjustment bolts protruding outside the integrating sphere and passing through the spherical cover, the bolts being driven by the active actuators arranged on the top thereof.

5. The object image digitizing device using an integrating sphere wave source in accordance with claim 4, further comprising multiple device for supplying original wave source in the space between the solid cover and the integrating sphere in order to feed the original waves into the integrating sphere.

6. The object image digitizing device using an integrating sphere wave source in accordance with claim 5, wherein a cooling fluid is configured to be circulated through the space.

7. The object image digitizing device using an integrating sphere wave source in accordance with claim 6, wherein the device is configured to supply original wave source on the down stream side of said cooling fluid.

8. The object image digitizing device using an integrating sphere wave source in accordance with claim 1, wherein the integrating sphere wave source includes multiple similar integrating sphere wave sources connected in cascade configuration in order to achieve the precision that the digitization requires.

9. The object image digitizing device using an integrating sphere wave source in accordance with claim 1, wherein the thickness distribution, shape and material of the partially-transparent and partially-reflective layer at the output and input ports of the waves are and can be modified so that the precision degree that the digitization requires is achieved and maintained.

10. The object image digitizing device using an integrating sphere wave source in accordance with claim 1, wherein the time variation of the spatial distribution of the illumination or the object to be digitized over the output port of the integrating sphere is controlled and maintained to a level lower than the digital accuracy resolution of the two-dimensional imaging device can represent.

11. The object image digitizing device using an integrating sphere wave source in accordance with claim 1, wherein the high digital accuracy resolution is achieved by keeping the time variation of illumination on the object to be digitized over the output port of the integrating sphere to less than $1/10^4$ and by performing more than 16 bits of quantization of digitization of the two-dimensional imaging device.

\* \* \* \* \*